United States Patent

Garbett

[11] 4,213,168
[45] Jul. 15, 1980

[54] ELECTRET CHARGE TECHNIQUE

[75] Inventor: Matthew G. Garbett, Los Altos Hills, Calif.

[73] Assignee: The United States of America as represented by the Secretary of the Air Force, Washington, D.C.

[21] Appl. No.: 926,360

[22] Filed: Jul. 20, 1978

[51] Int. Cl.$^2$ ............................................. B05C 1/04
[52] U.S. Cl. ................................................... 361/225
[58] Field of Search ............................. 361/225, 233

[56] References Cited

U.S. PATENT DOCUMENTS

| | | | |
|---|---|---|---|
| 3,835,355 | 9/1974 | Tsukada | 361/225 X |
| 3,867,674 | 2/1975 | Simm | 361/225 |

OTHER PUBLICATIONS

"Charging of Polymer Foils Using Liquid Contacts", Applied Physics Letter, vol. 21, No. 11, by Chudleigh, 12/172.

Primary Examiner—Harry E. Moose, Jr.
Attorney, Agent, or Firm—Joseph E. Rusz; Arsen Tashjian

[57] ABSTRACT

A dielectric tape of FEP (polyfluoroethylenepropylene) Teflon is electrostatically charged to a high level charge density using a motor driven capstan on which the tape is moved at a controlled velocity past a sponge assembly charged by a high DC voltage. The sponge assembly is wetted with a dielectric fluid mixture of methyl alcohol, ethyl alcohol and acetone. By endosmosis, a bead of fluid forms between the sponge and the FEP Teflon tape causing the fluid to be evenly distributed on the tape. An air blower directed onto the surface of the tape dries the tape as it passes by.

4 Claims, 2 Drawing Figures

ELECTRET CHARGE TECHNIQUE

STATEMENT OF GOVERNMENT INTEREST

The invention described herein may be manufactured and used by or for the Government for governmental purposes without the payment of any royalty thereon.

BACKGROUND OF THE INVENTION

This invention relates to an improved method and apparatus for electrostatically charging electrets and, more particularly, the invention is concerned with providing a technique for charging TEP Teflon tape by drawing past a wetted sponge containing a dielectric fluid mixture of methyl alcohol, ethyl alcohol and acetone. By endosmosis, a bead of fluid forms between the sponge and the FEP Teflon tape producing an evenly distributed over the tape, and thereafter is dried.

In the design of a reliable perimeter intrusion detection system, the electret tape concept was developed. An active ultrasonic doppler detection scheme utilizes a long, thin multi-layered tape containing an electret layer as the radiating and receiving transducer. This transducer is essentially an elongated electret microphone which functions as a radiator as well. The highly directional ultrasonic CW beam radiated by the tape uniformly all along its length illuminates any object crossing it. This action causes a reflected doppler-shifted ultrasonic signal that is received by the tape and separated from the driving signal by special hybrid electronic circuitry. A special processor then operates on the received signal and generates an appropriate alarm.

A large variety of techniques have been utilized in an attempt to produce electrets with increased and controlled electret strength with improved uniformity of interlayer spacings while still capable of being easily adaptable to large scale manufacturing. These techniques include irradiation of dielectrics usually in the presence of an electric field, electromagnetic radiation ranging in wavelength from thermal to gamma regions and, also, bombardment of dielectrics by charged-particle beams. None of these techniques was entirely satisfactory for a number of reasons including, poor uniformity, not easily repeatable, difficult of controlling, time consuming, etc.

Another charging process called "the liquid contact" technique has been employed using ethyl alcohol, acetone and water as the liquid contacts. A film of the contact liquid was applied to the upper surface of the polymer by the charging electrode. The resulting electrets lacked uniformity and the electret strengths varied considerably among the samples even though what seemed to be identical treatments were used. Also, over a long length of tape requiring continuous operation, the previous liquid-contact technique of using a sponge saturated with ethyl alcohol as the positive electrode was not satisfactory because it could not be adapted to produce a uniform charge over the entire length. A new design capable of allowing continuous charging of long samples to make long tapes of greater uniformity to a higher level than obtainable by previously known procedures is required.

SUMMARY OF THE INVENTION

The present invention is concerned with providing a technique for producing a long electret tap of FEP Teflon by causing the tape which is held tightly to a rotating capstan wheel to move past a stationary electrode which includes a saturated sponge of a dielectric mixture to which a voltage is applied. When the sponge is sufficiently soaked, the action of endosmosis causes a bead to be formed between the sponge and the FEP Teflon. The speed of the tape is adjusted so that the retreating portion of the tape is clear of all liquid droplets and then air dried by a blower. The fluid is replenished as needed.

Accordingly, it is an object of the invention to provide an improved electret charging technique wherein a long FEP Teflon tape can be continuously charged to a high level and still maintain good uniformity.

Another object of the invention is to provide a technique for charging long electret tapes suitable for use as ultrasonic transducers. The technique is easily adaptable to large scale manufacturing especially for continuous operation on long lengths of tape.

Still another object of the invention is to provide an improved electret charging technique which utilizes a modified liquid-contact procedure with the unique arrangement of allowing a bead of liquid to form between the sponge holding the dielectric mixture and the moving tape.

A further object of the invention is to provide an improved liquid-contact electret charging technique wherein the dielectric fluid used to wet the sponge to which the charging voltage is applied consists of a mixture of 72% methyl alcohol, 18% ethyl alcohol and 10% acetone.

A still further object of the invention is to provide a improved electret charging technique wherein an FEP Teflon tape can be continuously charged to a higher level, faster, cheaper, simpler and more uniformly than all other methods heretofore known.

These and other objects, features and advantages will become more apparent after considering the following detailed description taken in conjunction with the annexed drawings and appended claims.

DESCRIPTION OF A PREFERRED EMBODIMENT

Figure 1:
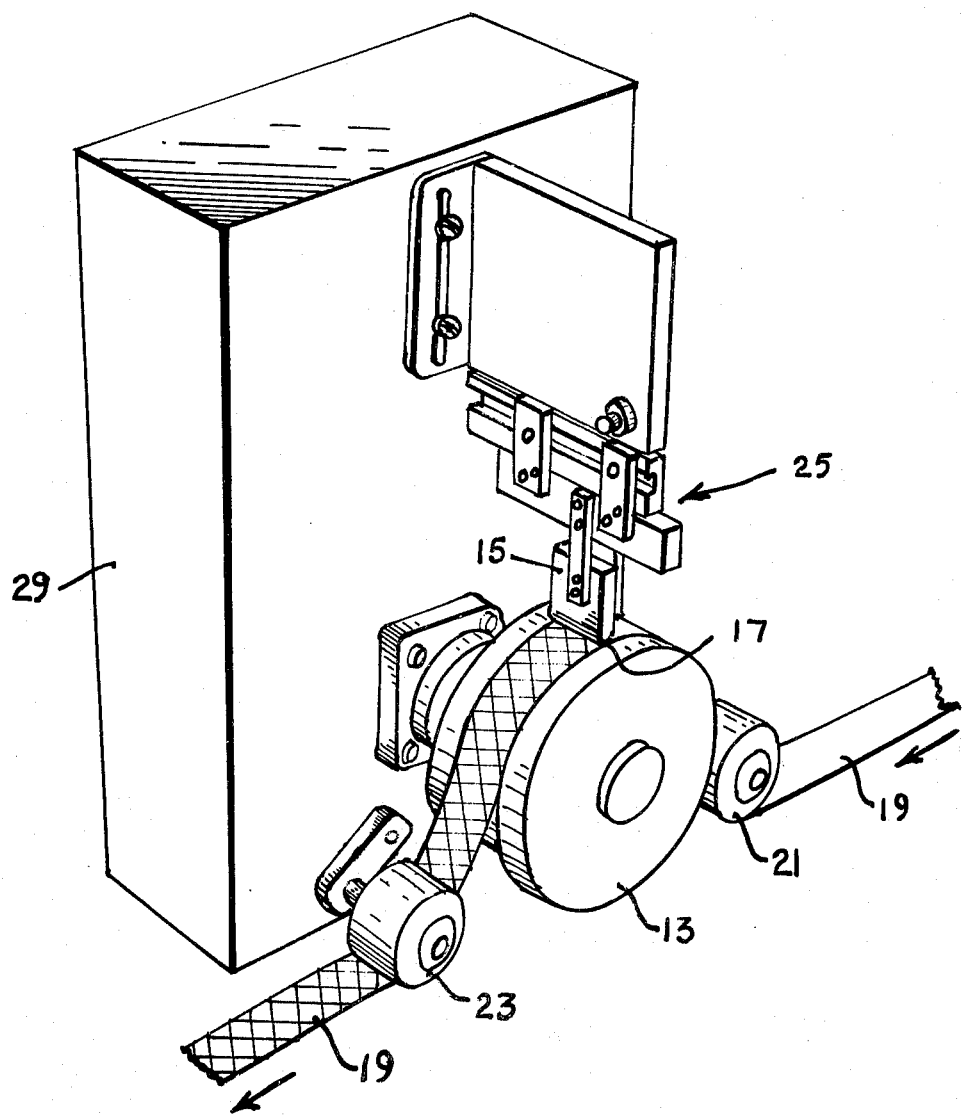
FIG. 1 is a view in perspective of the apparatus according to the invention for charging the FEP Teflon tape showing the wetted sponge of dielectric with the drying blower removed.
Figure 2:
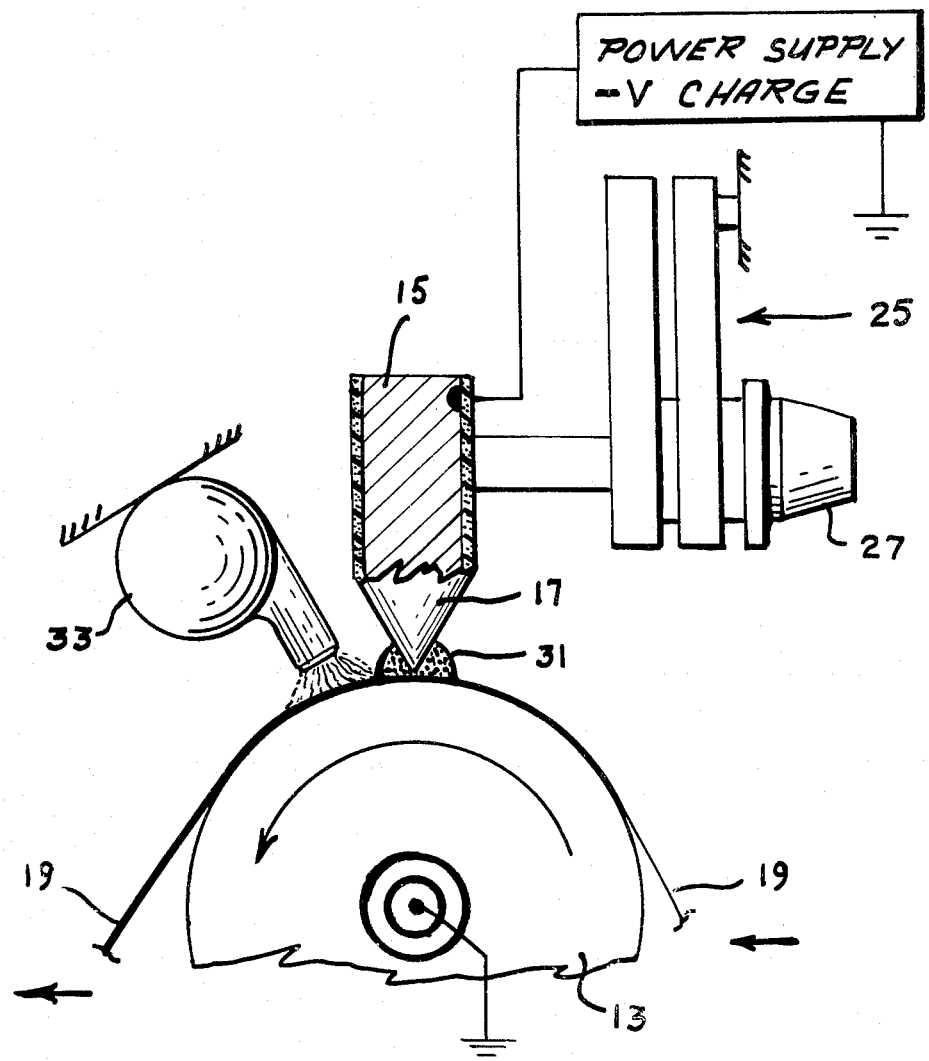
FIG. 2 is a view in schematic of the apparatus of FIG. 1 including the power supply, adjustably positioned charging electrode and drying blower.

Referring now to the drawings wherein like reference numerals refer to similar elements in both views, FIG. 1 shows the basic concept of the apparatus for practicing the controlled continuous electret charging techniques according to the invention. A central capstan member 13 is a large smooth surfaced wheel that is held very precisely by special bearings. This is necessary so that a stationary electrode which comprises a sponge 15 having a conically shaped lower end portion 17 can be held close to the surface of the capstan 13 without any appreciable variation during the rotation thereof. An electret film 19 is held tightly to the capstan 13 and rotates with it. The film 19 is fabricated of FEP (fluoroethylenepropylene) Teflon tape and passes under a first idler pulley 21 and a second idler pulley 23. By using the pulley/capstan arrangement shown, the film 19 can be unspooled into the charging apparatus and respooled as it emerges so that the operation can be continuous. The motion of the capstan wheel 13 is controlled by a variable speed motor (not shown) coupled to the capstan wheel 13 so that very slow steady rotation is achievable. The charging electrode sponge 15 is manually set and controlled through the use of a device 25 similar to a microscope stage which is adjustable in both the X and Y directions. The handle 27 (FIG. 2) serves to adjust the device 25 which determines the clearance between the tip 17 of the sponge 15 and the upper surface of the electret tape 19. The capstan 13 is supported entirely from one side in order to allow maximum access and permit easy threading of the long electret tapes 19.

The housing 29 which contains the motor and drive train, is fabricated of thick plates held together with heavy hardware to avoid excessive bending or vibration which might affect the capstan 13. The speed control (not shown) is connected to the device via a cable that allows the operator to stand a safe distance away during high voltage operation.

The dielectric fluid suitable for liquid contact charging is required to have the right electrical resistivity and the property that it evaporates rapidly under room conditions. One fluid which satisfies these requirements is a mixture of clean ethyl alcohol, pure methyl alcohol and acetone. This mixture is consistently capable of charging FEP Teflon films to surface potentials approximately equal to applied DC voltage. After the sponge 15 is soaked with the dielectric fluid and the charging voltage is applied, a bead of dielectric fluid 31 (FIG. 2) forms at the tip 17 of the sponge 15. This bead 31 is self-containing under the influence of the applied field. As the tape 19 continues to move past the stationary charging field, very little of the fluid leaves the bead 31 at the tip 17 of the sponge 15 where the electric field is most concentrated. This effect, called electrophoresis, is found to be must more effective in electret charging than physical sponge contact.

STATEMENT OF OPERATION

In order to process FEP Teflon tape, the gear-motor driven tape capstan 13, which may be machined from 7" diameter wheel to close tolerance for controlled velocity, rotates during the continuous charge process. The charging is accomplished by applying the desired voltage to the sponge 15 and wetting the sponge 15 with the dielectric mixture until electrophoresis forms a fluid bead 31 between the sponge 15 and the FEP Teflon tape 19. The speed of the tape 19 is then adjusted such that the retreating portion is clear of all liquid droplets. The tape 19 is finally dried with room temperature air by the blower 33. The fluid in the sponge 15 is replenished as needed and to compensate for evaporation.

The preferred fluid mixture for use in the electret charging process is a mixture by volume of 72% methyl alcohol (pure), 18% ethyl alcohol (pure) and 10% acetone (pure). The fluid mix should not be exposed to air for more than six hours because it is hydrophylic and highly water absorbing. This water absorption decreases the resistivity of the fluid mixture causing edge leakage of the charge which results in loss of charge uniformity and charge life. Also, if a leakage path is provided by the sponge 15 to ground, a loss of charge uniformity will result.

The particular composition of the dielectric fluid mixture is highly critical. Pure ethyl alcohol has too low an inherent resistivity at practical purity levels while methyl alcohol has too high a resistivity level to provide proper buffer recycling and therefore can't provide enough charge current to maintain charge application. A proper ratio of these two alcohols is required to create the requisite impedance necessary to induce the charge. The acetone acts as a penetrator carrier that allows ions to wet the Teflon and penetrate to a sufficient depth to insure charge permanence.

Although the invention has been illustrated in the accompanying drawings and described in the foregoing specification in terms of a preferred embodiment thereof, the invention is not limited to this embodiment. It will be apparent to those skilled in the art that certain changes, modifications and substitutions can be made in the hereinbefore described invention, particularly with regard to the construction details, without departing from the true spirit and scope of the appended claims.

Having thus set forth the nature of my invention, what I claim and desire to secure by Letters Patent of the United States is:

1. An electret charging apparatus for electrostatically charging dielectric tapes to a high level charge density comprising, a motor driven capstan having a dielectric tape positioned thereover for movement therewith, a sponge assembly positioned above said tape in close proximity thereto, the lower portion of said sponge being substantially conical in configuration, said sponge assembly being charged by a high DC voltage, a dielectric fluid disposed within said sponge in sufficient amount to form a fluid bead between the lowermost portion of said sponge assembly and the upper surface of said dielectric tape through a process of electrophoresis such that the tape becomes evenly wetted with the fluid mixture as the capstan with the tape thereover rotates and passes under the sponge assembly.

2. The electret charging apparatus defined in claim 1 including means for drying the fluid on said dielectric tape after the tape has been charged and passes the sponge assembly.

3. The electret charging apparatus defined in claim 1 wherein said dielectric fluid consists of a mixture by volume of 72% methyl alcohol, 18% ethyl alcohol and 10% acetone.

4. The electret charging apparatus defined in claim 3 wherein the dielectric tape is polyfluoroethylenepropylene.

* * * * *